United States Patent
Toriyama et al.

(10) Patent No.: US 9,598,118 B2
(45) Date of Patent: Mar. 21, 2017

(54) VEHICULAR FLOOR BRACE

(71) Applicant: TOYODA IRON WORKS CO., LTD., Toyota-shi, Aichi (JP)

(72) Inventors: Hiroshi Toriyama, Toyota (JP); Akira Obayashi, Toyota (JP); Nobuhiro Ando, Toyota (JP); Keisuke Kamiya, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 0 days.

(21) Appl. No.: 14/906,477

(22) PCT Filed: Apr. 1, 2014

(86) PCT No.: PCT/JP2014/059684
§ 371 (c)(1),
(2) Date: Jan. 20, 2016

(87) PCT Pub. No.: WO2015/011957
PCT Pub. Date: Jan. 29, 2015

(65) Prior Publication Data
US 2016/0159405 A1    Jun. 9, 2016

(30) Foreign Application Priority Data
Jul. 23, 2013  (JP) .................................. 2013-152606

(51) Int. Cl.
*B62D 25/20*   (2006.01)
*B62D 27/02*   (2006.01)

(52) U.S. Cl.
CPC ............. *B62D 25/20* (2013.01); *B62D 27/02* (2013.01)

(58) Field of Classification Search
CPC .............................. B62D 25/20; B62D 27/02
(Continued)

(56) References Cited

U.S. PATENT DOCUMENTS

| | | | | |
|---|---|---|---|---|
| 4,899,843 A | * | 2/1990 | Takano | B62D 21/11 180/312 |
| 5,756,167 A | * | 5/1998 | Tamura | B21C 37/0803 228/146 |

(Continued)

FOREIGN PATENT DOCUMENTS

| JP | 2008-184125 A | 8/2008 |
|---|---|---|
| JP | 2011-000917 A | 1/2011 |
| JP | 2012-224242 A | 11/2012 |

OTHER PUBLICATIONS

Jun. 17, 2014 Search Report issued in International Patent Application No. PCT/JP2014/059684.

(Continued)

*Primary Examiner* — Gregory Blankenship
(74) *Attorney, Agent, or Firm* — Oliff PLC (57) ABSTRACT

A vehicle floor brace has a tubular body formed by rounding a sheet metal material, and a pair of attachment portions made of the sheet metal material and formed integrally with the tubular body at both ends in a longitudinal direction of the tubular body, and the vehicle floor brace is fixedly attached to an underside of a floor panel of a vehicle via the attachment portions to reinforce the floor panel, each of the attachment portions being configured to include a flat portion having an attachment surface to be attached to the floor panel, and a pair of reinforcing flanges formed by bending both side portions of the flat portion at right angles so that the side portions extend downward to an opposite side from the attachment surface and so that the attachment portion has a dish-shaped section.

6 Claims, 8 Drawing Sheets

(58) Field of Classification Search
USPC ....... 296/187.08, 193.07, 204; D12/159, 223
See application file for complete search history.

(56) References Cited

U.S. PATENT DOCUMENTS

| | | | | |
|---|---|---|---|---|
| 5,813,718 | A * | 9/1998 | Masuda | B60J 5/0444 |
| | | | | 296/146.6 |
| 7,905,503 | B2 * | 3/2011 | Goto | B62D 25/087 |
| | | | | 280/124.109 |
| 2007/0045034 | A1 * | 3/2007 | Kim | B62D 25/20 |
| | | | | 180/379 |
| 2010/0320801 | A1 * | 12/2010 | Kitai | B62D 21/157 |
| | | | | 296/187.08 |
| 2012/0267918 | A1 * | 10/2012 | Murata | B62D 25/2027 |
| | | | | 296/204 |
| 2014/0021746 | A1 * | 1/2014 | Franzpotter | B62D 21/11 |
| | | | | 296/193.07 |
| 2014/0234018 | A1 * | 8/2014 | Imamura | F16B 17/004 |
| | | | | 403/273 |
| 2016/0059808 | A1 * | 3/2016 | Ohtani | B60R 19/02 |
| | | | | 293/104 |
| 2016/0107704 | A1 * | 4/2016 | Terada | B60K 1/04 |
| | | | | 296/193.07 |
| 2016/0159405 | A1 * | 6/2016 | Toriyama | B62D 27/02 |
| | | | | 296/193.07 |
| 2016/0200191 | A1 * | 7/2016 | Ito | B60K 15/073 |
| | | | | 280/834 |
| 2016/0207568 | A1 * | 7/2016 | Natsume | B62D 25/2036 |

OTHER PUBLICATIONS

Mar. 2, 2016 Office Action issued in Japanese Patent Application No. 2013-152606.

* cited by examiner

FIG.6A
PARTIALLY BENDING STEP

FIG.6B
WHOLLY BENDING STEP

FIG.6C
ROUNDING STEP

FIG.12A
PARTIALLY BENDING STEP

FIG.12B
WHOLLY BENDING STEP

FIG.12C
ROUNDING STEP

FIG.13

VEHICULAR FLOOR BRACE

TECHNICAL FIELD

The present invention relates to vehicle floor braces, and more particularly to a technique of improving torsional rigidity while securing space under a vehicle.

BACKGROUND ART

A vehicle floor brace is known which has (a) a tubular body formed by rounding a sheet metal material, and (b) a pair of attachment portions made of the sheet metal material and formed integrally with the tubular body at both ends in the longitudinal direction of the tubular body, and (c) which is fixedly attached to the underside of a floor panel of a vehicle via the attachment portions to reinforce the floor panel (see Patent Document 1).

RELATED ART DOCUMENTS

Patent Documents

Patent Document 1: Japanese Patent Application Publication No. 2011-917

SUMMARY OF THE INVENTION

Problems to be Solved by the Invention

In such a conventional vehicle floor brace, however, since the tubular body is formed so as to protrude downward with respect to the attachment portions at both ends thereof, the minimum ground clearance may not be able to be secured depending on the positions at which the attachment portions are fixed to the floor panel. Moreover, since the centerline (center of gravity) of the tubular body is displaced downward with respect to attachment surfaces of the attachment portions, torsional rigidity based on the attachment surfaces is reduced, which may affect reinforcing strength. Increasing the thickness of the sheet metal material or the cross-sectional area of the tubular body in order to ensure predetermined reinforcing strength increases the weight.

The present invention was developed in view of the above circumstances, and it is an object of the present invention to improve, while securing space under a vehicle, torsional rigidity of a vehicle floor brace that is disposed over the underside of a floor panel to reinforce the floor panel.

Means for Solving the Problem

To achieve the above object, a first aspect of the invention provides a vehicle floor brace that has (a) a tubular body formed by rounding a sheet metal material, and (b) a pair of attachment portions made of the sheet metal material and formed integrally with the tubular body at both ends in a longitudinal direction of the tubular body, and (c) that is fixedly attached to an underside of a floor panel of a vehicle via the attachment portions to reinforce the floor panel, the vehicle floor brace characterized in that (d) each of the attachment portions includes a flat portion having an attachment surface to be attached to the floor panel, and a pair of reinforcing flanges formed by bending both side portions of the flat portion at right angles so that the side portions extend downward to an opposite side from the attachment surface and so that the attachment portion has a dish-shaped section, and (e) a position of the tubular body relative to the pair of attachment portions in a vertical direction is determined so that a lower end of the tubular body is located within a range of tolerance equal to a thickness of the sheet metal material in upward and downward directions from a horizontal imaginary plane that contacts lower ends of the reinforcing flanges.

A second aspect of the invention provides the vehicle floor brace recited in the first aspect of the invention, characterized in that (a) the pair of attachment portions are disposed so that the attachment surfaces are located in a single common horizontal plane, and (b) the position of the tubular body relative to the pair of attachment portions in the vertical direction is determined so that a center of gravity of the tubular body in section perpendicular to the longitudinal direction is located within a range of tolerance equal to the thickness of the sheet metal material in the upward and downward directions from the plane.

A third aspect of the invention provides a vehicle floor brace that has (a) a tubular body formed by rounding a sheet metal material, and (b) a pair of attachment portions made of the sheet metal material and formed integrally with the tubular body at both ends in a longitudinal direction of the tubular body, and (c) that is fixedly attached to an underside of a floor panel of a vehicle via the attachment portions to reinforce the floor panel, the vehicle floor brace characterized in that (d) each of the attachment portions includes an attachment surface to be attached to the floor panel, and the attachment surfaces of the attachment portions are located in a single common horizontal plane, and (e) a position of the tubular body relative to the pair of attachment portions in a vertical direction is determined so that a center of gravity of the tubular body in section perpendicular to the longitudinal direction is located within a range of tolerance equal to a thickness of the sheet metal material in upward and downward directions from the plane.

A fourth aspect of the invention provides the vehicle floor brace recited in any one of the first through third aspects of the invention, characterized in that the tubular body is formed by rounding the sheet metal material such that both side portions of the sheet metal material abut on each other, the tubular body is disposed over the floor panel in such an attitude that the portions caused to abut on each other by the rounding are located on a lower side, and the tubular body has a horizontal flat back portion at its upper end so that an upper part of the section perpendicular to the longitudinal direction has a rectangular shape.

As used herein, the terms "downward" or "lower side," "lower end," "horizontal," "vertical direction" or "upward and downward directions," and "upper part" in each of the inventions are defined based on the state where the vehicle floor brace is attached to the floor panel of the vehicle in a horizontal attitude.

Effects of the Invention

In the vehicle floor brace recited in the first aspect of the invention, the position of the tubular body relative to the pair of attachment portions in the vertical direction is determined so that the lower end of the tubular body is located near the imaginary plane that contacts the lower ends of the reinforcing flanges. The tubular body is therefore lifted relative to the attachment portions. The space under the vehicle and located below the tubular body is thus increased, and the minimum ground clearance can be appropriately secured. Since the tubular body is lifted relative to the attachment portions, displacement (offset) between the center of gravity of the tubular body and the attachment surfaces of the attachment portions in the vertical direction is reduced.

Moreover, each attachment portion has the pair of reinforcing flanges. Torsional rigidity is thus improved, and the floor panel can be appropriately reinforced without increasing the thickness or the cross-sectional area of the tubular body.

In the second aspect of the invention, the attachment surfaces of the pair of attachment portions are located in the single common horizontal plane, and the position of the tubular body relative to the pair of attachment portions in the vertical direction is determined so that the center of gravity (corresponding to the centerline) of the tubular body is located near the plane. The tubular body is therefore appropriately torsionally deformed about the center of gravity with respect to the attachment surfaces, and the torsional rigidity can further be improved.

In the third aspect of the invention, as in the second aspect of the invention, the attachment surfaces of the pair of attachment portions are located in the single common horizontal plane, and the position of the tubular body relative to the pair of attachment portions in the vertical direction is determined so that the center of gravity (corresponding to the centerline) of the tubular body is located near the plane. The tubular body is therefore appropriately torsionally deformed about the center of gravity with respect to the attachment surfaces, the torsional rigidity is thus improved, and the floor panel can be appropriately reinforced without increasing the thickness or the cross-sectional area of the tubular body. Since the tubular body is lifted relative to the attachment portions, the space under the vehicle and located below the tubular body is increased, and the minimum ground clearance can be appropriately secured.

In the fourth aspect of the invention, the tubular body is disposed in such an attitude that the portions caused to abut on each other are located on the lower side, and the tubular body has the horizontal flat back portion at its upper end so that the upper part of the section perpendicular to the longitudinal direction has a rectangular shape. Therefore, the torsional rigidity is higher than that of the tubular body having a simple cylindrical shape, and thus reinforcing strength can be improved while space above and below the tubular body is secured. In other words, the thickness or the cross-sectional area can be reduced while ensuring predetermined reinforcing strength. A reduced weight and a compact configuration can therefore be achieved.

MODES FOR CARRYING OUT THE INVENTION

The vehicle floor brace of the present invention is fixedly attached to the underside of the floor panel of the vehicle via a bracket etc. For example, such a tubular body is preferably used that has the substantially horizontal flat back portion at its upper end so that the upper part of the section of the tubular body perpendicular to the longitudinal direction thereof has a rectangular shape, namely so that the sectional shape of the tubular body is the shape of a home plate or a U-shape whose opening is closed. However, the tubular body may be in various forms. For example, the tubular body may have a simple cylindrical shape. Namely, the tubular body may be formed by merely rounding the sheet metal material so that the tubular body has a substantially circular section. The sheet metal material may be rounded such that the side portions abut on each other or such that the side portions are placed on each other. It is desirable that the side portions be firmly joined by welding etc. such as arc welding.

The attachment portions of the first aspect of the invention include the reinforcing flanges formed by bending the side portions of the flat portion substantially at right angles. However, the attachment portions of the third aspect of the invention need not necessarily have the reinforcing flanges. Although the attachment portions of the third aspect of the invention may be configured similarly to the first aspect of the invention, other reinforcing structures may be used for the attachment portions of the third aspect of the invention. In the second and third aspects of the invention, the attachment surfaces of the pair of attachment portions are located in the single common substantially horizontal plane. In the first aspect of the invention, however, the attachment surfaces of the pair of attachment portions need not necessarily be located in a single common plane. The pair of attachment portions may be in various forms. For example, such attachment portions may be used that are tilted upward or downward further away from the tubular body. The single plane is a plane parallel to the centerline of the tubular body, and the vehicular floor brace is attached to the floor panel in such an attitude that this single plane extends substantially horizontally. For example, the pair of attachment portions are formed symmetrically with respect to the tubular body.

In the first aspect of the invention, such a position of the tubular body that the lower end of the tubular body is located at substantially the same position as the imaginary plane is defined by using the thickness of the sheet metal material, and the position of the tubular body relative to the attachment portions in the vertical direction is determined so that the lower end of the tubular body is located at substantially the same position as the imaginary plane. In the third aspect of the invention, such a position of the tubular body that the center of gravity of the tubular body is located at substantially the same position as the single plane is defined by using the thickness of the sheet metal material, and the position of the tubular body relative to the attachment portions in the vertical direction is determined so that the center of gravity of the tubular body is located at substantially the same position as the single plane.

Embodiments

Embodiments of the present invention will be described in detail with reference to the accompanying drawings.

Figure 1:
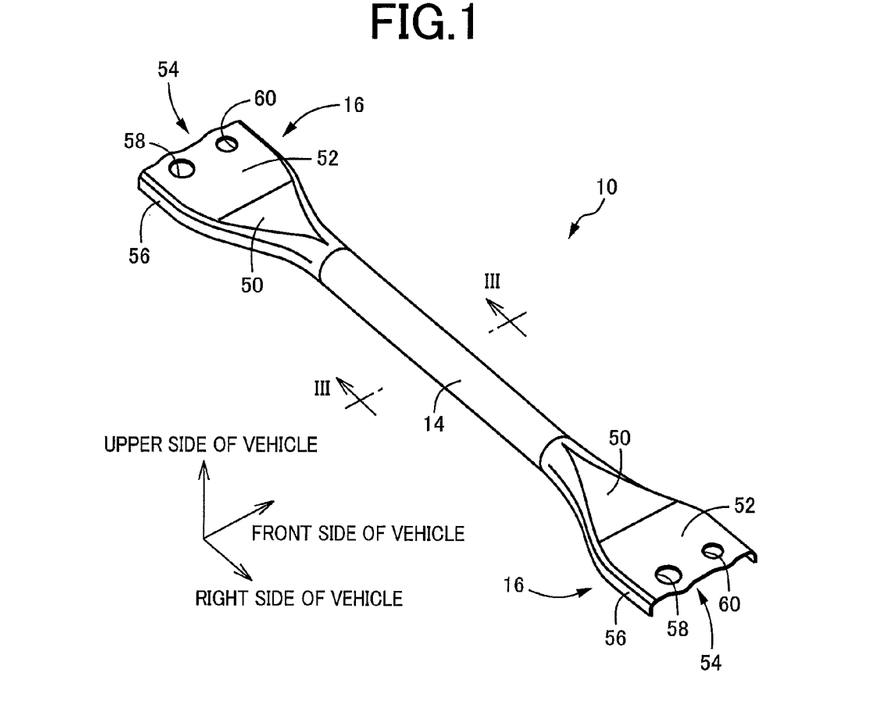
FIG. 1 is a perspective view of an example of a vehicle floor brace to which the present invention is applied, as viewed obliquely from above in such an attitude that the vehicle floor brace is mounted on a vehicle.
Figure 2:
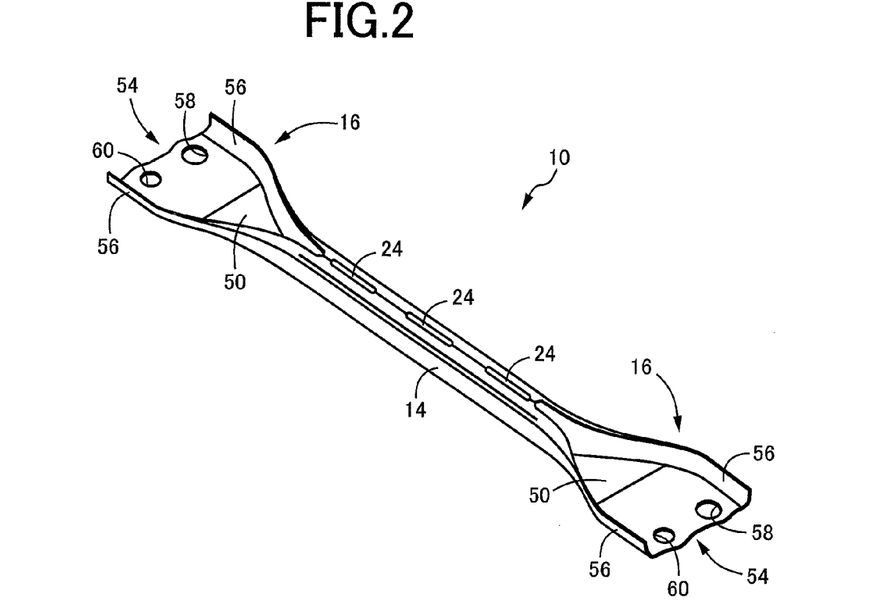
FIG. 2 is a perspective view of the vehicle floor brace of FIG. 1 as viewed from below.
Figure 3:
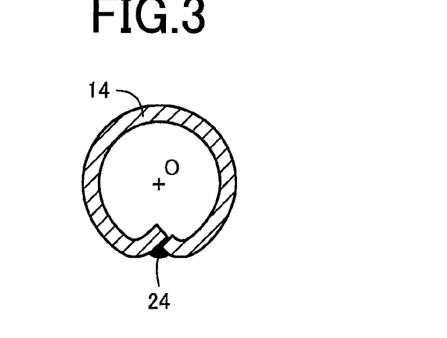
FIG. 3 is an enlarged sectional view of the tubular portion taken along line III-III and viewed in the direction shown by the arrows in FIG. 1.
Figure 4:
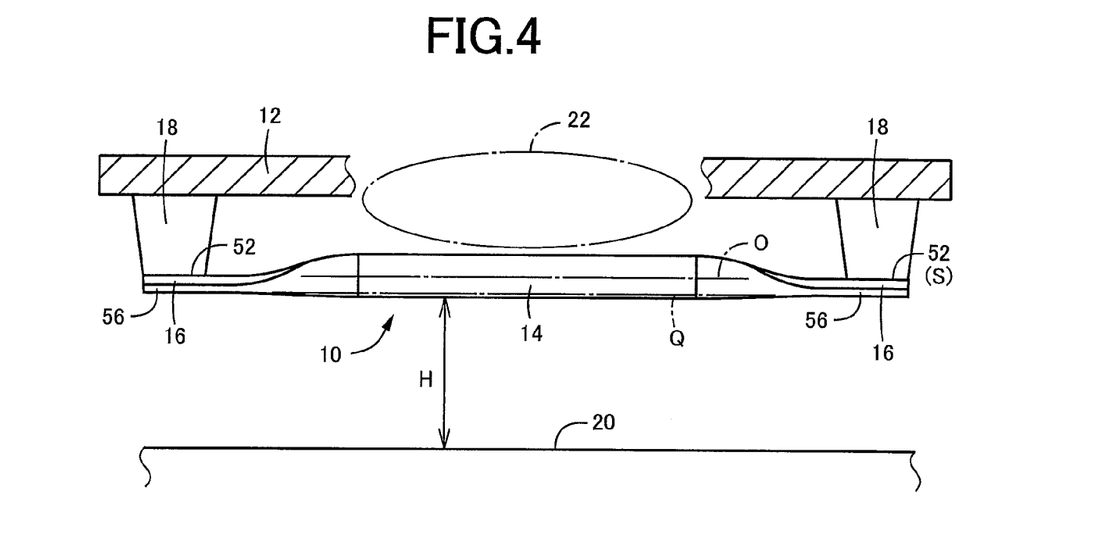
FIG. 4 is a schematic diagram illustrating the vehicle floor brace of FIG. 1 attached to a floor panel.
Figure 5:
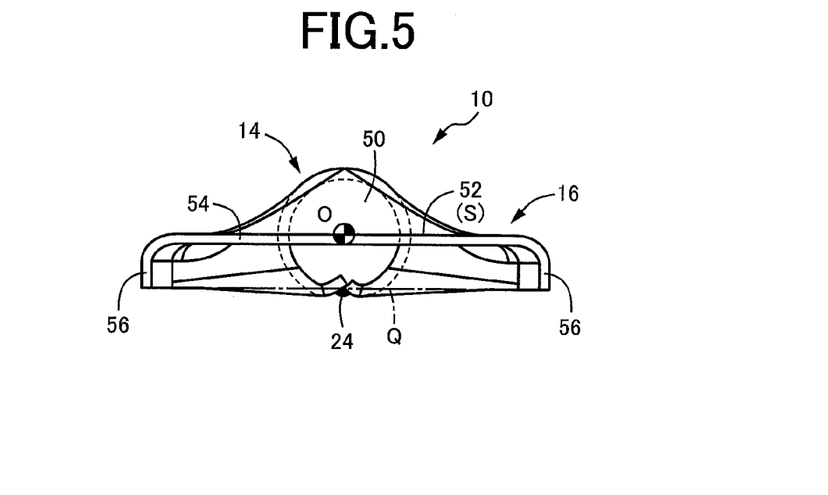
FIG. 5 is a side view of the vehicle floor brace of FIG. 1 as viewed from its one end side in the axial direction.

FIG. 1 is a perspective view of a vehicle floor brace 10 to which the present invention is applied, as viewed obliquely from above in such an attitude that the vehicle floor brace 10 is mounted on a vehicle. FIG. 2 is a perspective view of the vehicle floor brace 10 as viewed from below. FIG. 3 is an enlarged sectional view taken along line and viewed in the direction shown by the arrows in FIG. 1. FIG. 4 is a schematic diagram illustrating the vehicle floor brace 10 attached to a floor panel 12. FIG. 5 is a side view of the vehicle floor brace 10 as viewed from its one end side in the axial direction. The vehicle floor brace 10 has a tubular body 14 formed by rounding a sheet metal material, and a pair of attachment portions 16 formed integrally with the tubular body 14 at both ends in the longitudinal direction of the tubular body 14. The vehicle floor brace 10 is disposed over the underside of the floor panel 12 of the vehicle in such an attitude that the vehicle floor brace 10 extends substantially horizontally in the lateral direction of the vehicle, and the vehicle floor brace 10 is fixedly attached to the lower side of the floor panel 12 via the attachment portions 16 to reinforce the floor panel 12. The pair of attachment portions 16 are symmetrically formed on both sides in the longitudinal direction of the tubular body 14, and are firmly fixed to the floor panel 12 via brackets 18. This vehicle floor brace 10 is placed in a predetermined limited space so that a piping space 22 for an exhaust pipe etc. is provided between the vehicle floor brace 10 and the floor panel 12 while securing predetermined minimum ground clearance H from a road surface 20.

Figure 6A:
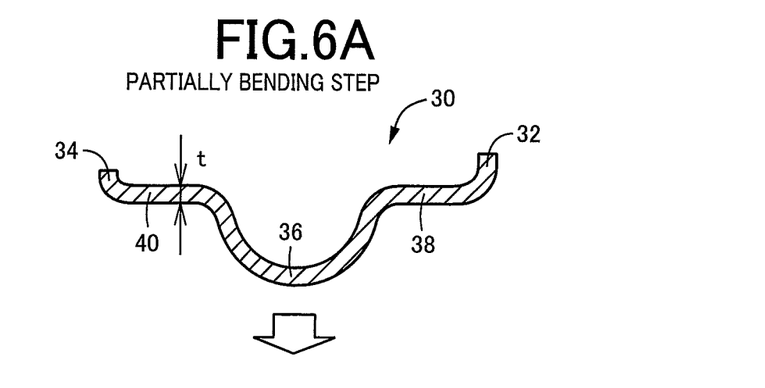
FIGS. 6A to 6C are diagrams illustrating a process of forming the tubular body of the vehicle floor brace of FIG. 1 using pressing.
Figure 6B:
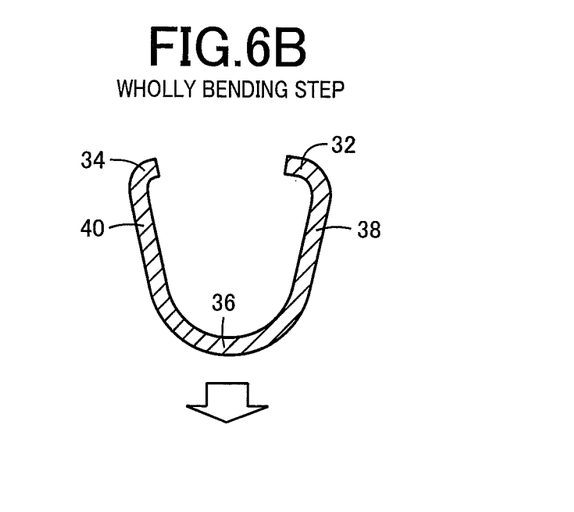
Figure 6C:
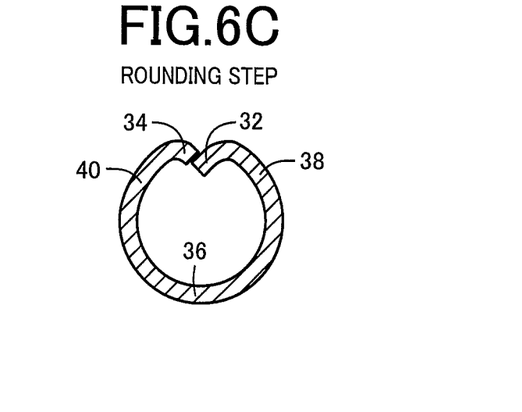

As shown in FIG. 3, the tubular body 14 is formed by rounding a sheet metal material into a substantially cylindrical shape such that both side portions of the sheet metal material abut on each other. The abutting portions are joined by a joint portion 24 formed by arc welding etc., and the tubular body 14 is disposed in such an attitude that the abutting portions are located on the lower side. FIGS. 6A to 6C are diagrams illustrating a process of forming the tubular body 14 by rounding using pressing. FIGS. 6A to 6C show sectional views perpendicular to the longitudinal direction of the tubular body 14, showing the tubular body 14 in such an attitude that the tubular body 14 is turned upside down from FIG. 3. In a partially bending step of FIG. 6A, both side portions 32, 34 of a sheet metal material 30 are bent substantially at right angles, and a protruding portion 36 having a semi-cylindrical shape corresponding to an intended cylindrical shape is formed in the middle part of the sheet metal material 30 so as to protrude to the opposite side from the side portions 32, 34. A galvanized steel sheet, a high-tensile steel sheet, etc. having a thickness t in the range of about 2 to 3 mm is preferably used as the sheet metal material 30. In a wholly bending step of FIG. 6B, boundary portions between the protruding portion 36 and flat intermediate portions 38, 40 between the protruding portion 36 and the side portions 32, 34 are made substantially straight so that the intermediate portions 38, 40 extend in the direction of a tangent to the arc of the protruding portion 36. In a rounding step of FIG. 6C, the intermediate portions 38, 40 are rounded inward so that the side portions 32, 34 get closer to each other, and the side portions 32, 34 are caused to abut on each other so that the end face of one side portion 34 contacts the outer side surface of the other side portion 32. In this state, the portion where the side portions 32, 34 abut on each other is subjected to arc welding etc. to firmly join the side portions 32, 34 by the joint portion 24. The intended tubular body 14 is thus produced.

The pair of attachment portions 16 are formed integrally with the tubular body 14 at both ends in the longitudinal direction of the tubular body 14 having a substantially cylindrical shape via gradually changing portions 50 that are formed in a substantially triangular shape so that the side portions 32, 34 are gradually separated further away from each other as further away from the both ends of the tubular body 14. Each attachment portion 16 has a flat portion 54 having an attachment surface 52 to be attached to the tip end face (downward facing surface) of the bracket 18, and a pair of reinforcing flanges 56 formed by bending both side portions of the flat portion 54 substantially at right angles so that the side portions extend downward to the opposite side from the attachment surface 52 and so that the attachment portion 16 has a dish-shaped section. The pair of attachment portions 16 are disposed so that the attachment surfaces 52 are located in a single common plane S. The pair of attachment portions 16 are fixedly attached to the brackets 18 in such an attitude that the attachment surfaces 52 extend substantially horizontally and face upward. Each flat portion 54 has a pair of attachment holes 58, 60, and the attachment portions 16 are firmly fixed to the brackets 18 by fastening means such as a bolt such that the attachment surfaces 52 closely contact the brackets 18.

The reinforcing flanges 56 have a fixed height dimension (dimension by which the reinforcing flanges 56 protrude downward), and the position of the tubular body 14 relative to the pair of attachment portions 16 in the vertical direction is determined so that the lower end of the tubular body 14 is located at substantially the same position as an imaginary plane Q that contacts the tip ends (lower ends) of the reinforcing flanges 56, that is, so that the lower end of the tubular body 14 is located within the range (Q±t) of tolerance equal to the thickness t of the sheet metal material 30 in the upward and downward directions from the imaginary plane Q. The position of the tubular body 14 relative to the pair of attachment portions 16 in the vertical direction is also determined so that the center of gravity O of the tubular body 14 (corresponding to the centerline of the tubular body 14) is located within the range (S±t) of tolerance equal to the thickness t of the sheet metal material 30 in the upward and downward directions from the plane S in section perpendicular to the longitudinal direction of the tubular body 14. As can be seen from FIG. 5, the position of the tubular body 14 relative to the pair of attachment portions 16 in the longitudinal direction of the vehicle (the lateral direction in FIG. 5) is determined so that the tubular body 14 is located in the middle of each attachment portion 16.

In such a vehicle floor brace 10 of the present embodiment, the position of the tubular body 14 relative to the pair of attachment portions 16 in the vertical direction is determined so that the lower end of the tubular body 14 is located near the imaginary plane Q that contacts the lower ends of the reinforcing flanges 56. The tubular body 14 is therefore lifted relative to the attachment portions 16. The space under the vehicle and located below the tubular body 14 is thus increased, and the minimum ground clearance H can be appropriately secured.

Since the tubular body 14 is lifted relative to the attachment portions 16, displacement (offset) between the center of gravity O of the tubular body 14 and the attachment surfaces 52 of the attachment portions 16 in the vertical direction is reduced. Moreover, each attachment portion 16 has the pair of reinforcing flanges 56. Torsional rigidity is thus improved, and the floor panel 12 can be appropriately reinforced without increasing the thickness t or the cross-sectional area of the tubular body 14.

In the present embodiment, the attachment surfaces 52 of the pair of attachment portions 16 are located in the single common horizontal plane S, and the position of the tubular body 14 relative to the pair of attachment portions 16 in the vertical direction is determined so that the center of gravity O of the tubular body 14 is located near the plane S. The tubular body 14 is therefore appropriately torsionally deformed about the center of gravity O with respect to the attachment surfaces 52, and the torsional rigidity can further be improved.

Since the position of the tubular body 14 relative to the pair of attachment portions 16 in the vertical direction is determined so that the center of gravity O of the tubular body 14 is located near the plane S, the tubular body 14 is lifted relative to the attachment portions 16. In this respect as well, the space under the vehicle and located below the tubular body 14 is increased, and the minimum ground clearance H can be appropriately secured.

Figure 7:
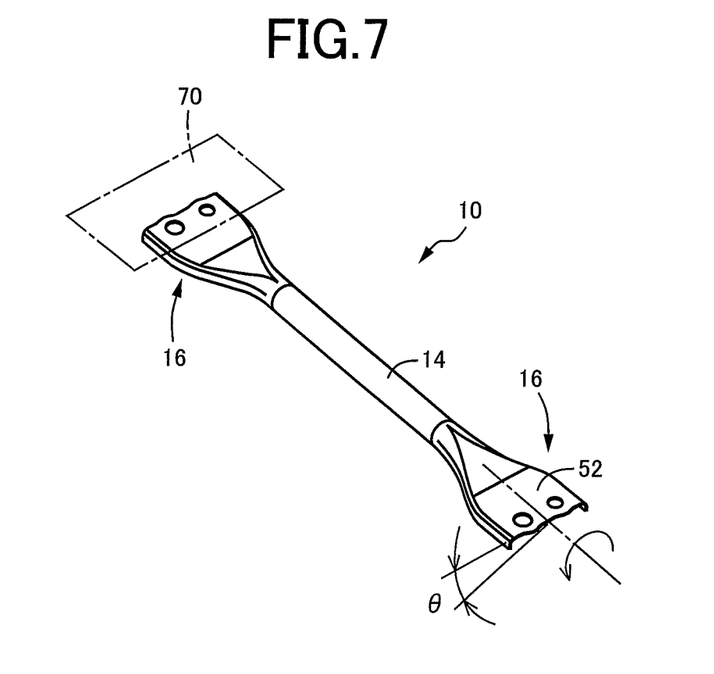
FIG. 7 is a diagram illustrating torsional rigidity of the vehicle floor brace.
Figure 8:
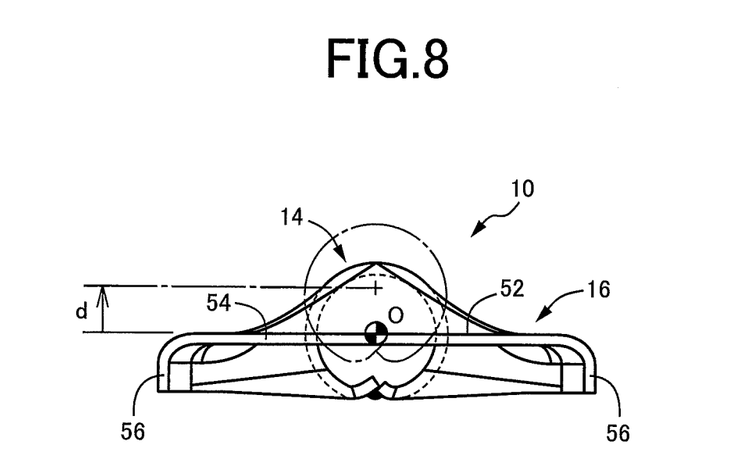
FIG. 8 is a diagram illustrating a displacement d in the case where the position of the center of gravity of the tubular body of the vehicle floor brace was displaced in order to examine torsional rigidity.
Figure 9:
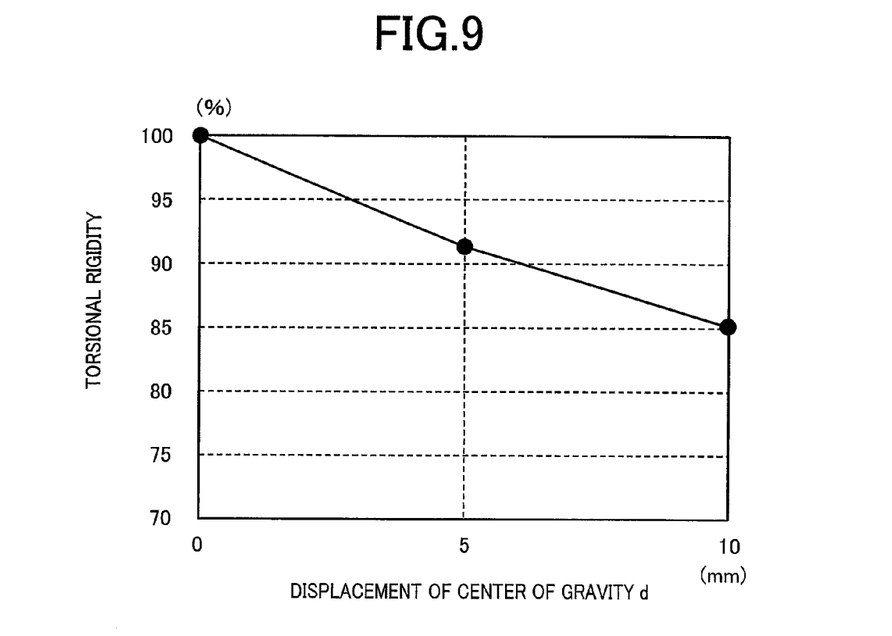
FIG. 9 is a diagram showing the result of examining the relationship between the displacement d in FIG. 8 and the torsional rigidity.

A shape model of the vehicle floor brace 10 of the present embodiment and a shape model of a comparative product in which the position of the center of gravity O is displaced upward from the attachment surfaces 52 as shown by an alternate long and short dash line in FIG. 8 were prepared. With one attachment portion 16 being fixed to a support block 70 as shown in FIG. 7, torque was applied to the other attachment portion 16 about the centerline of the attachment surface 52 thereof (in the embodiment, about the center of gravity O of the tubular body 14) to rotate the other attachment portion 16 by an angle θ in order to examine torsional rigidity (Nm/deg) by FEM analysis. The result shown in FIG. 9 was obtained. FIG. 9 is a diagram in which torsional rigidity is 100% in the product of the present invention, namely in the case where the center of gravity O is located at substantially the same position as the attachment surfaces 52. The torsional rigidity decreases by about 8% in the case where displacement d of the center of gravity 0 is 5 mm, and decreases by about 15% in the case where the displacement d is 10 mm.

Figure 10:
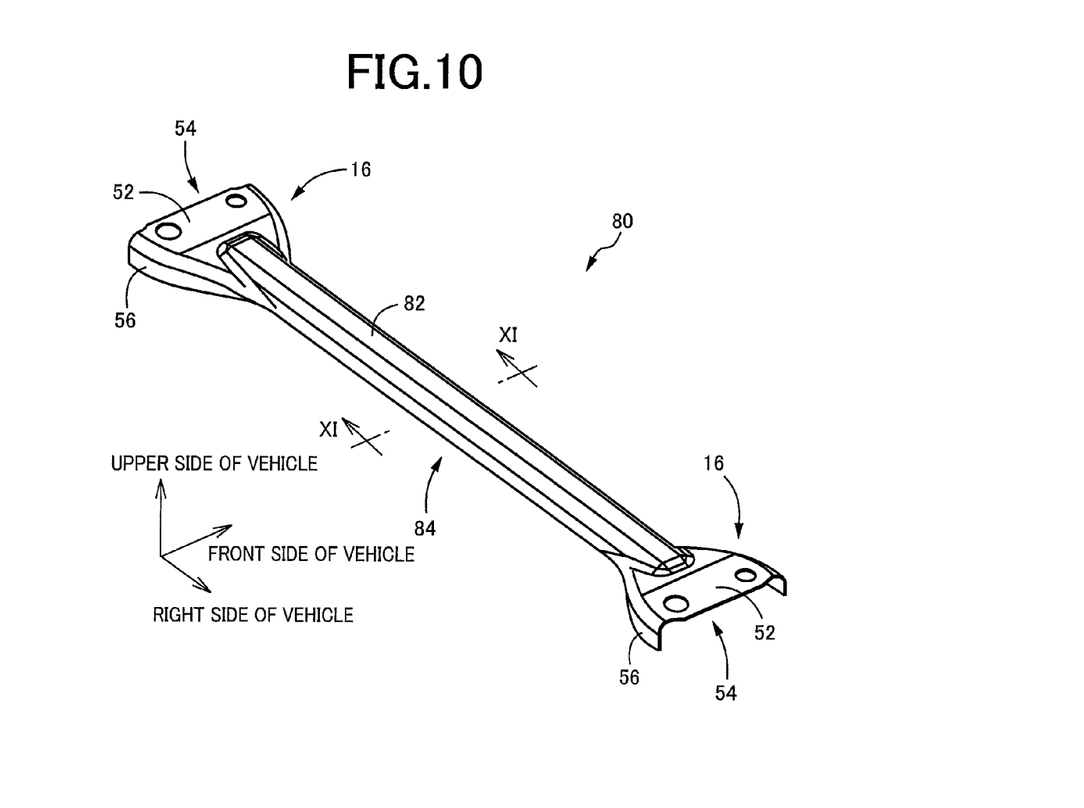
FIG. 10 is a perspective view of another example of the vehicle floor brace to which the present invention is applied, and corresponding to FIG. 1.
Figure 11:
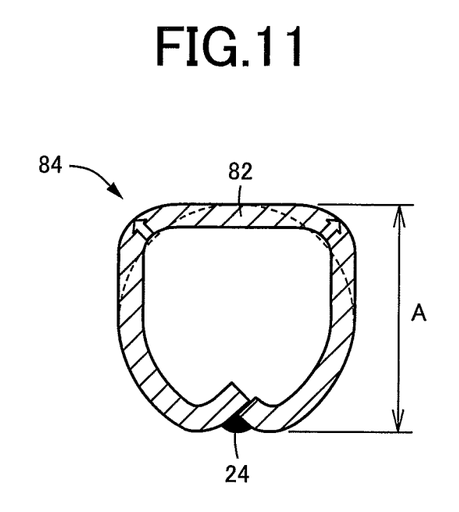
FIG. 11 is an enlarged sectional view of a tubular body taken along line XI-XI and viewed in the direction shown by the arrows in FIG. 10.
Figure 12A:
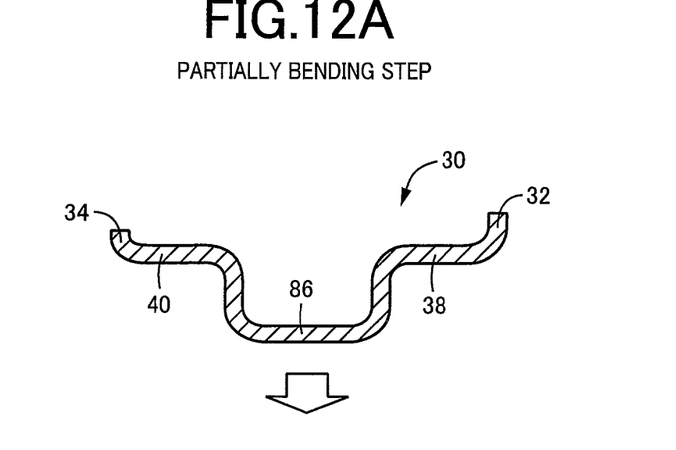
FIGS. 12A to 12C are diagrams illustrating a process of forming the tubular body of the vehicle floor brace of FIG. 10 using pressing.
Figure 12B:
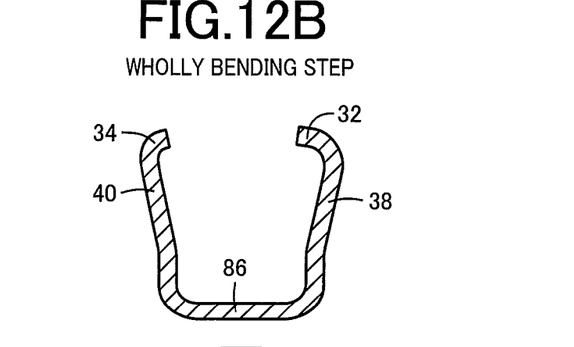
Figure 12C:
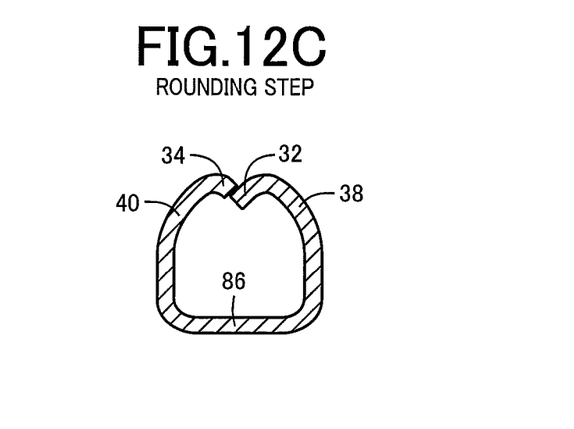

In the above embodiment, the tubular body 14 has a simple cylindrical shape. However, a tubular body 84 may be used as in a vehicle floor brace 80 shown in FIGS. 10 and 11. The tubular body 84 has a substantially horizontal flat back portion 82 at the top thereof so that the upper part of a section of the tubular body 84 perpendicular to the longitudinal direction thereof has a rectangular shape and so that the overall sectional shape of the tubular body 84 is the shape of a home plate or a U-shape whose opening is closed. For comparison, a dashed line in FIG. 11 shows the contour of the tubular body 14 having a simple cylindrical shape. The tubular body 84 has such a sectional shape that the right and left sides of the upper part of the tubular body 14 are extended outward so as to be angulated as shown by white arrows. FIGS. 12A to 12C show diagrams illustrating a process of forming such a tubular body 84 by rounding using pressing. Like the tubular body 14, the tubular body 84 can be formed by a partially bending step of FIG. 12A; a wholly bending step of FIG. 12B, and a rounding step of FIG. 12C. In this case, a protruding portion 86 having a rectangular section corresponding to the flat back portion 82 is formed instead of the semi-cylindrical protruding portion 36 in the partially bending step of FIG. 12A.

Figure 13:
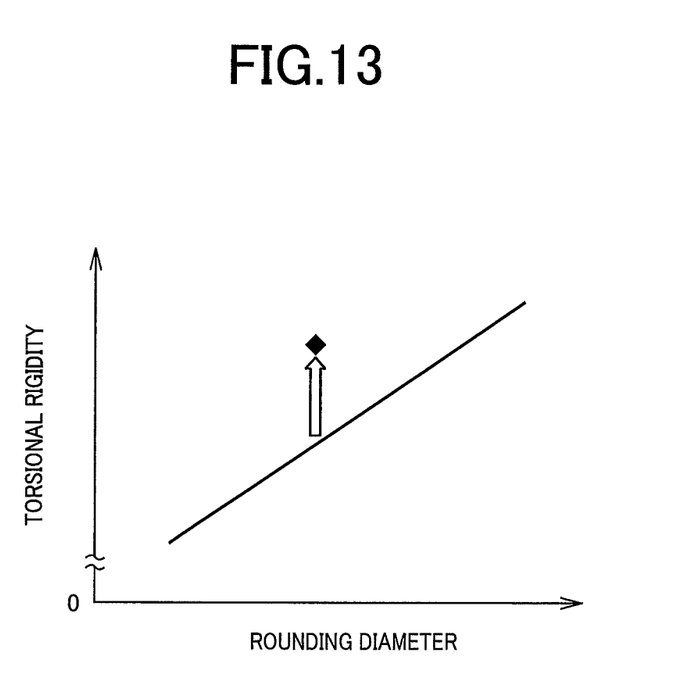
FIG. 13 is a diagram showing torsional rigidity of the vehicle floor brace of FIG. 10 as compared to the case of simple rounding shown in FIG. 1.

According to such a vehicle floor brace 80, the torsional rigidity is about 20% higher than that of the tubular body 14 having a simple cylindrical shape shown by the dashed line in FIG. 11. As shown in FIG. 13, the larger the rounding diameter is, the higher the torsional rigidity is. However, the use of the tubular body 84 having the flat back portion 82, namely having an irregular section, can increase the torsional rigidity as shown by the symbol "♦" without increasing the rounding diameter, i.e., the height dimension A in FIG. 11, and can thus improve reinforcing strength while securing space above and below the tubular body 84. In other words, the thickness t or the cross-sectional area can be reduced while ensuring predetermined reinforcing strength. A reduced weight and a compact configuration can therefore be achieved.

Although the embodiments of the present invention are described above in detail based on the drawings, the embodiments are shown by way of example only, and the present invention can be embodied in various modified or improved forms based on the knowledge of those skilled in the art.

NOMENCLATURE OF ELEMENTS

10, 80: vehicle floor brace 12: floor panel 14, 84: tubular body 16: attachment portions 30: sheet metal material 52: attachment surfaces 54: flat portions 56: reinforcing flanges 82: flat back portion S: single plane Q: imaginary plane O: center of gravity t: thickness of the sheet metal material

The invention claimed is:

1. A vehicle floor brace that has a tubular body formed by rounding a sheet metal material, and a pair of attachment portions made of the sheet metal material and formed integrally with the tubular body at both ends in a longitudinal direction of the tubular body, and the vehicle floor brace being fixedly attached to an underside of a floor panel of a vehicle via the attachment portions to reinforce the floor panel, each of the attachment portions being configured to include a flat portion having an attachment surface to be attached to the floor panel, and a pair of reinforcing flanges formed by bending both side portions of the flat portion at right angles so that the side portions extend downward to an opposite side from the attachment surface and so that the attachment portion has a dish-shaped section, and a position of the tubular body relative to the pair of attachment portions in a vertical direction being determined so that a lower end of the tubular body is located within a range of tolerance equal to a thickness of the sheet metal material in upward and downward directions from a horizontal imaginary plane that contacts lower ends of the reinforcing flanges.

2. The vehicle floor brace according to claim 1, wherein the pair of attachment portions are disposed so that the attachment surfaces are located in a single common horizontal plane, and the position of the tubular body relative to the pair of attachment portions in the vertical direction is determined so that a center of gravity of the tubular body in section perpendicular to the longitudinal direction is located within a range of tolerance equal to the thickness of the sheet metal material in the upward and downward directions from the plane.

3. The vehicle floor brace according to claim 1, wherein the tubular body is formed by rounding the sheet metal material such that both side portions of the sheet metal material abut on each other, the tubular body is disposed over the floor panel in such an attitude that the portions caused to abut on each other by the rounding are located on a lower side, and the tubular body has a horizontal flat back portion at its upper end so that an upper part of the section perpendicular to the longitudinal direction has a rectangular shape.

4. The vehicle floor brace according to claim 2, wherein the tubular body is formed by rounding the sheet metal material such that both side portions of the sheet metal material abut on each other, the tubular body is disposed over the floor panel in such an attitude that the portions caused to abut on each other by the rounding are located on a lower side, and the tubular body has a horizontal flat back portion at its upper end so that an upper part of the section perpendicular to the longitudinal direction has a rectangular shape.

5. A vehicle floor brace that has a tubular body formed by rounding a sheet metal material, and a pair of attachment portions made of the sheet metal material and formed integrally with the tubular body at both ends in a longitudinal direction of the tubular body, and the vehicle floor brace being fixedly attached to an underside of a floor panel of a vehicle via the attachment portions to reinforce the floor panel,
   each of the attachment portions being configured to include an attachment surface to be attached to the floor panel, and the attachment surfaces of the attachment portions are located in a single common horizontal plane, and
   a position of the tubular body relative to the pair of attachment portions in a vertical direction being determined so that a center of gravity of the tubular body in section perpendicular to the longitudinal direction is located within a range of tolerance equal to a thickness of the sheet metal material in upward and downward directions from the plane.

6. The vehicle floor brace according to claim 5, wherein the tubular body is formed by rounding the sheet metal material such that both side portions of the sheet metal material abut on each other, the tubular body is disposed over the floor panel in such an attitude that the portions caused to abut on each other by the rounding are located on a lower side, and the tubular body has a horizontal flat back portion at its upper end so that an upper part of the section perpendicular to the longitudinal direction has a rectangular shape.

\* \* \* \* \*